United States Patent Office.

HORACE THAYER, OF JOHNSONSBURG, NEW YORK.

Letters Patent No. 88,926, dated April 13, 1869.

---

IMPROVED COMPOUND FOR FILLING THE PORES AND COATING WOOD.

---

The Schedule referred to in these Letters Patent and making part of the same.

---

*To all whom it may concern:*

Be it known that I, HORACE THAYER, of Johnsonsburg, Wyoming county, New York, have invented a new and improved Painting-Composition; and I do hereby declare that the following is a full, clear, and exact description thereof, which will enable others skilled in the art to make and use the same.

This invention relates to a new compound which is to be used for filling the pores of wood or other material, as a first coat of paint, or also as a second coat, if desired.

The compound consists of glue and clay, in the proportions of about one part of glue to four of clay. These proportions may, however, be modified, in accordance with the quality of clay, or with the kind of paint to be made.

The clay, blue clay being preferred, having been mixed with cold water to the requisite consistency, is strained or ground between stones, but may also be used without straining or grinding. Then the glue, which has previously been dissolved in hot water, is added.

The glue will hold the clay in solution, otherwise the same would be precipitated in the water. The clay prevents the glue from coagulating, and thus the liquid or pasty mass is kept in the desired state for a considerable length of time without settling or drying, if protected from the influences of the atmosphere.

The mixture is applied by means of a brush, sponge, roller, or other suitable mechanism. When applied, it dries readily, and fills the pores of the article which it covers. It is tough and adhesive, these being the chief qualities necessary for a filling-paint. When dry, it can be rubbed down, to obtain a smooth surface.

It will be noticed that the compound remains liquid in a cold state, and can thus be preserved for a long time. It is also applied in a cold state.

If the glue had alone been dissolved in water, it would coagulate as soon as it became cold. If the clay were simply mixed with water, it would at once settle therein. The two substances, clay and glue, combined, will serve to hold each other suspended, so that a thick paint, of reliable character, is produced.

Having thus described my invention,

What I claim as new, and desire to secure by Letters Patent, is—

The compound, consisting of the ingredients herein set forth, substantially as specified.

HORACE THAYER.

Witnesses:
FRANK BLOCKLEY,
ALEX. F. ROBERTS.